(12) United States Patent  
Sugiue

(10) Patent No.: US 9,288,518 B2
(45) Date of Patent: Mar. 15, 2016

(54) INFORMATION PROCESSING SYSTEM, INFORMATION PROCESSING APPARATUS, AND INFORMATION PROCESSING METHOD

(71) Applicant: Sony Corporation, Tokyo (JP)

(72) Inventor: Yuki Sugiue, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 13/912,273

(22) Filed: Jun. 7, 2013

(65) Prior Publication Data

US 2013/0347024 A1 Dec. 26, 2013

(30) Foreign Application Priority Data

Jun. 15, 2012 (JP) ................................ 2012-135949

(51) Int. Cl.
H04N 21/258 (2011.01)
H04N 21/422 (2011.01)
H04N 21/443 (2011.01)
H04N 21/41 (2011.01)
H04N 21/436 (2011.01)
H04N 21/478 (2011.01)
H04N 21/81 (2011.01)

(52) U.S. Cl.
CPC ..... *H04N 21/25875* (2013.01); *H04N 21/4126* (2013.01); *H04N 21/422* (2013.01); *H04N 21/4222* (2013.01); *H04N 21/42204* (2013.01); *H04N 21/42207* (2013.01); *H04N 21/42219* (2013.01); *H04N 21/43615* (2013.01); *H04N 21/443* (2013.01); *H04N 21/4431* (2013.01); *H04N 21/478* (2013.01); *H04N 21/8186* (2013.01)

(58) Field of Classification Search
CPC ....................... H04N 21/8173; H04N 21/8186
See application file for complete search history.

(56) References Cited

U.S. PATENT DOCUMENTS

| | | | | |
|---|---|---|---|---|
| 2007/0254640 A1* | 11/2007 | Bliss | ............................. | 455/420 |
| 2008/0157993 A1* | 7/2008 | Du Breuil et al. | ............ | 340/825 |
| 2010/0222102 A1* | 9/2010 | Rodriguez | ..................... | 455/557 |
| 2012/0096386 A1* | 4/2012 | Baumann et al. | ............. | 715/772 |
| 2013/0014040 A1* | 1/2013 | Jagannathan et al. | ........ | 715/765 |
| 2013/0014136 A1* | 1/2013 | Bhatia et al. | ...................... | 725/9 |

FOREIGN PATENT DOCUMENTS

JP 06-062464 3/1994

\* cited by examiner

*Primary Examiner* — Justin Shepard
(74) *Attorney, Agent, or Firm* — Lerner, David, Littenberg, Krumholz & Mentlik, LLP

(57) ABSTRACT

The present disclosure is intended to facilitate the transmission of information associated with content being viewed on a public device to a private device. In response to a request from a content reception apparatus, a tablet terminal and a mobile telephone transmit information associated with an action and an application that are coordinatable with the content being displayed to the content reception apparatus. In response to a user operation, the tablet terminal selects a user-specified application from a list of applications displayed on a display of the content reception apparatus and transmits this select information to the content reception apparatus. If a coordination command of an action for coordination with an active application comes from the content reception apparatus, then the mobile telephone executes the received command. The present disclosure is applicable to information processing systems operating the content reception apparatus by using a terminal in wireless communication, for example.

17 Claims, 13 Drawing Sheets

F I G . 5
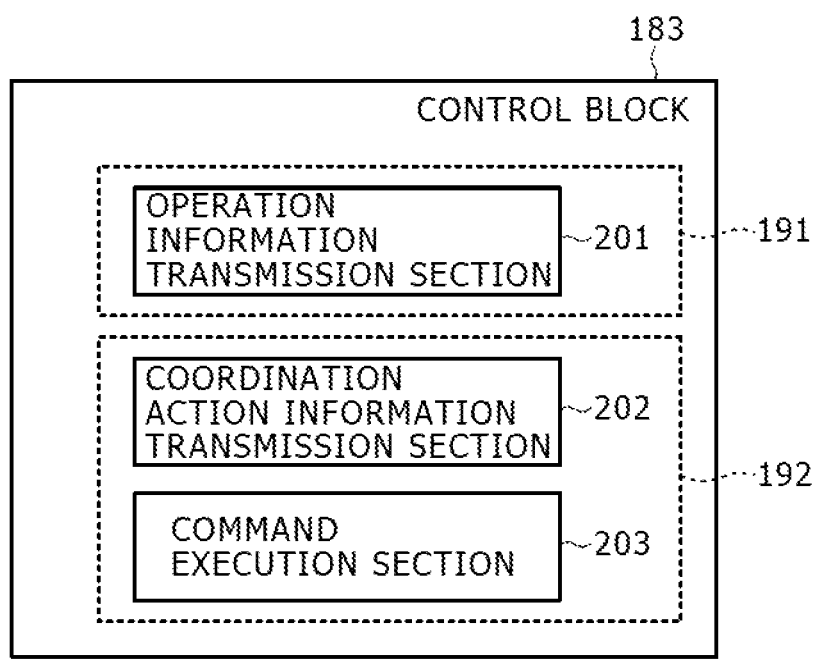

FIG. 8

| SERIAL NUMBER | IDENTIFICATION ID | APPLICATION NAME | COORDINATION FUNCTION NAME | ACCOUNT INFORMATION | ICON IMAGE DATA INFORMATION |
|---|---|---|---|---|---|
| 1 | 3 | AAA | PPPP | Tom Brown | XXXX |
| 2 | 5 | BBB | QQQQ | | YYYY |
| 3 | 13 | CCC | RRRR | Tom Brown | ZZZZ |
| 4 | 16 | DDD | SSSS | | |

INFORMATION PROCESSING SYSTEM, INFORMATION PROCESSING APPARATUS, AND INFORMATION PROCESSING METHOD

CROSS-REFERENCE TO RELATED APPLICATION

The present application claims priority from Japanese Patent Application No. JP 2012-135949 filed in the Japanese Patent Office on Jun. 15, 2012, the entire content of which is incorporated herein by reference.

BACKGROUND

The present technology relates to an information processing system, an information processing apparatus, and an information processing method and, more particularly, to an information processing system, an information processing apparatus, and an information processing method that are configured to easily coordinate content being viewed on a public device with an application running in a private device.

It is sometimes practiced that a mobile terminal is used for a remote controller to control the operation of a television receiver while viewing content being played on the television receiver.

For example, Japanese Patent Laid-open No. Hei 6-62464 discloses a technology in which operation commands executable on a television receiver are displayed and the displayed commands are selected by use of a remote controller to operate the television receiver.

On the other hand, in these days, a variety of applications can be installed on television receivers and mobile terminals.

Consequently, attempts are made, with a television receiver with various applications installed, to notify one of these applications of the contents of a piece of content being viewed for use by operating a mobile terminal.

SUMMARY

However, in some cases, a desired application that is installed on one's mobile terminal may not be installed on one's television receiver.

While a mobile terminal is a device of private use, a television receiver is a public device in general. Therefore, even if a desired application is installed on a television receiver, that television receiver may have been logged in by the account of other family member than by the own account. In addition, even if a television is logged in by own account, the contents of an application installed on the television may be viewed by other family members viewing together.

Therefore, the present technology addresses the above-identified and other problems associated with related-art methods and apparatuses and solves the addressed problems by providing an information processing system, and information processing apparatus, and an information processing method that are configured to easily coordinate the content being viewed on a public device with an application installed on a private device.

In carrying out the present disclosure and according to a first mode thereof, there is provided an information processing system. This information processing system is configured by a first information processing apparatus and a second information processing apparatus. The first information processing apparatus has an application information request block configured to request a second information processing apparatus for information about a coordinatable application in response to a user operation; an application information reception block configured to receive the information about the application of the second information processing apparatus transmitted from the second information processing apparatus in response to the request from the application information request block; and a command transmission section configured to transmit a command for executing a user-specified application among coordinatable applications to the second information processing apparatus corresponding to the user-specified application on the basis of the information of the application of the second information processing apparatus received by the application information reception block. The second information processing apparatus has an application information transmission block configured to transmit the information about the application of the second information processing apparatus requested by the application information request block to the first information processing apparatus; and a command execution block configured to execute the command transmitted by the command transmission section.

In carrying out the present disclosure and according to a second mode thereof, there is provided an information processing apparatus. This information processing apparatus has an application information request block configured to request other information processing apparatuses for information about a coordinatable application in response to a user operation; an application information reception block configured to receive the information about the applications of the other information processing apparatuses transmitted from the other information processing apparatuses in response to the request by the application information request block; and a command transmission section configured to transmit a command for executing a user-specified application among coordinatable applications to the other information processing apparatuses corresponding to the user-specified application on the basis of the information of the application of the other information processing apparatuses received by the application information reception block.

In the above-mentioned information processing apparatus, the application information request block can request for information about an application that is coordinatable with a situation in the information processing apparatus.

The above-mentioned information processing apparatus further has a display control block configured to display a list of the coordinatable applications on the basis of the information about the applications of the other information processing apparatuses received by the application information reception block.

In the above-mentioned information processing apparatus, the display control block displays the list of applications in accordance with priorities of the applications.

In the above-mentioned information processing apparatus, the priorities of the applications are changed in accordance with usage frequencies of the applications.

In the above-mentioned information processing apparatus, the priorities of the applications get higher when any one of other information processing apparatuses corresponding to any one of the applications is in use.

In the above-mentioned information processing apparatus, the display control block displays the list of applications in a layered structure in accordance with the priorities of the applications.

In the above-mentioned information processing apparatus, the display control block displays the list of applications in a first layer in accordance with the priorities of the applications, a list of the other information apparatuses in a second layer, and the list of applications of each of the other information processing apparatuses in a third layer.

In the above-mentioned information processing apparatus, the display control block adds, for each of the applications, information indicative of other information processing apparatuses corresponding to the applications, and displays the list of applications.

In the above-mentioned information processing apparatus, if an application to be executed is selected from the list of applications, the display control block displays a moving image that disappears from a screen as if the selected application moved to another information processing apparatus.

The above-mentioned information processing apparatus further has an own information capture section. This own information capture section is configured to capture information of an own coordinatable application in response to the user operation. In this configuration, on the basis of information about applications of other information processing apparatuses received by the application information reception and information about an own application captured by the own information capture block, the command transmission section transmits a command for executing a user-specified application among the coordinatable applications to any of the other information processing apparatuses corresponding to the applications or this information processing apparatus.

In carrying out the present disclosure and according to the second mode thereof, there is provided an information processing method. This information processing method includes causing an information processing apparatus to request another information processing apparatus for information about a coordinatable application in response to a user operation; causing the information processing apparatus to receive the information about the application of the above-mentioned another information processing apparatus transmitted therefrom in response to the requesting; and causing the information processing apparatus to transmit a command for executing a user-specified application among coordinatable applications to the above-mentioned another information processing apparatus corresponding to the user-specified application on the basis of the received information of the application of the above-mentioned another information processing apparatus.

In carrying out the present disclosure and according to a third mode thereof, there is provided an information processing apparatus. This information processing apparatus has an application information transmission block configured, in response to a request for information about a coordinatable application transmitted in response to a user operation to an authenticated information processing apparatus from another information processing apparatus, to transmit the application information to the above-mentioned another information processing apparatus; and a command execution block configured, if a command for executing a user-specified application among coordinatable applications comes on the basis of the application information transmitted from the application information transmission block, to execute the command.

The above-mentioned information processing apparatus further has a display control block configured to display a moving image appearing from outside a screen as if the application moved from the above-mentioned another information processing apparatus when a command for executing the application comes.

In carrying out the present disclosure and according to the third mode thereof, there is provided an information processing method. This information processing method includes causing an information processing apparatus to transmit, in response to a request for information about a coordinatable application transmitted in response to a user operation to an authenticated information processing apparatus from another information processing apparatus, the application information to the above-mentioned another information processing apparatus; and causing the information processing apparatus to execute a command for executing a user-specified application among coordinatable applications when the command comes on the basis of the application information.

In the first mode of the present disclosure, the first information processing apparatuses requests the second information processing apparatus for information associated with coordinatable applications in response to a user operation. In response to this request, the information associated with applications of the second information processing apparatus transmitted therefrom is received. On the basis of the received information about applications of the second information processing, a command for executing a user-specified application among the coordinatable applications is transmitted to the second information processing apparatus corresponding to any of these applications. At the same time, the second information processing apparatus transmits the requested information associated with applications of the second information processing apparatus to the first information processing apparatus and the transmitted command is executed on the basis of this information.

In the second mode of the present disclosure, another information processing apparatus is requested for information about coordinatable applications in response to a user operation. In response to this request, the information about applications of another information processing apparatus transmitted therefrom is received. Then, on the basis of the received information about applications of another information processing apparatus, a command for executing a user-specified application among coordinatable applications is transmitted to another information processing apparatus corresponding to the user-specified application.

In the third mode of the present disclosure, in response to a request for information about coordinatable applications coming from another information processing apparatus in response to a user operation, the information about applications is transmitted to the above-mentioned another information processing apparatus. Then, on the basis of the transmitted information about applications, a command for executing a user-specified application among coordinatable applications is executed when this command comes.

According to the present disclosure, content being executed on a public device can be easily coordinated with an application running on a private device.

BRIEF DESCRIPTION OF THE DRAWINGS

FIG. 5 is a block diagram illustrating an exemplary functional configuration of another control block;

FIG. 8 is a diagram illustrating an exemplary configuration of content coordination action information;

DETAILED DESCRIPTION OF THE PREFERRED EMBODIMENTS

The technology disclosed herein will be described in further detail by way of embodiments thereof with reference to the accompanying drawings. It should be noted that the description will be done in the following order.

1. First embodiment (Information processing system)
2. Second embodiment (Computer)

1. First Embodiment (Information Processing System)
[Configuration of Information Processing System]

Figure 1:
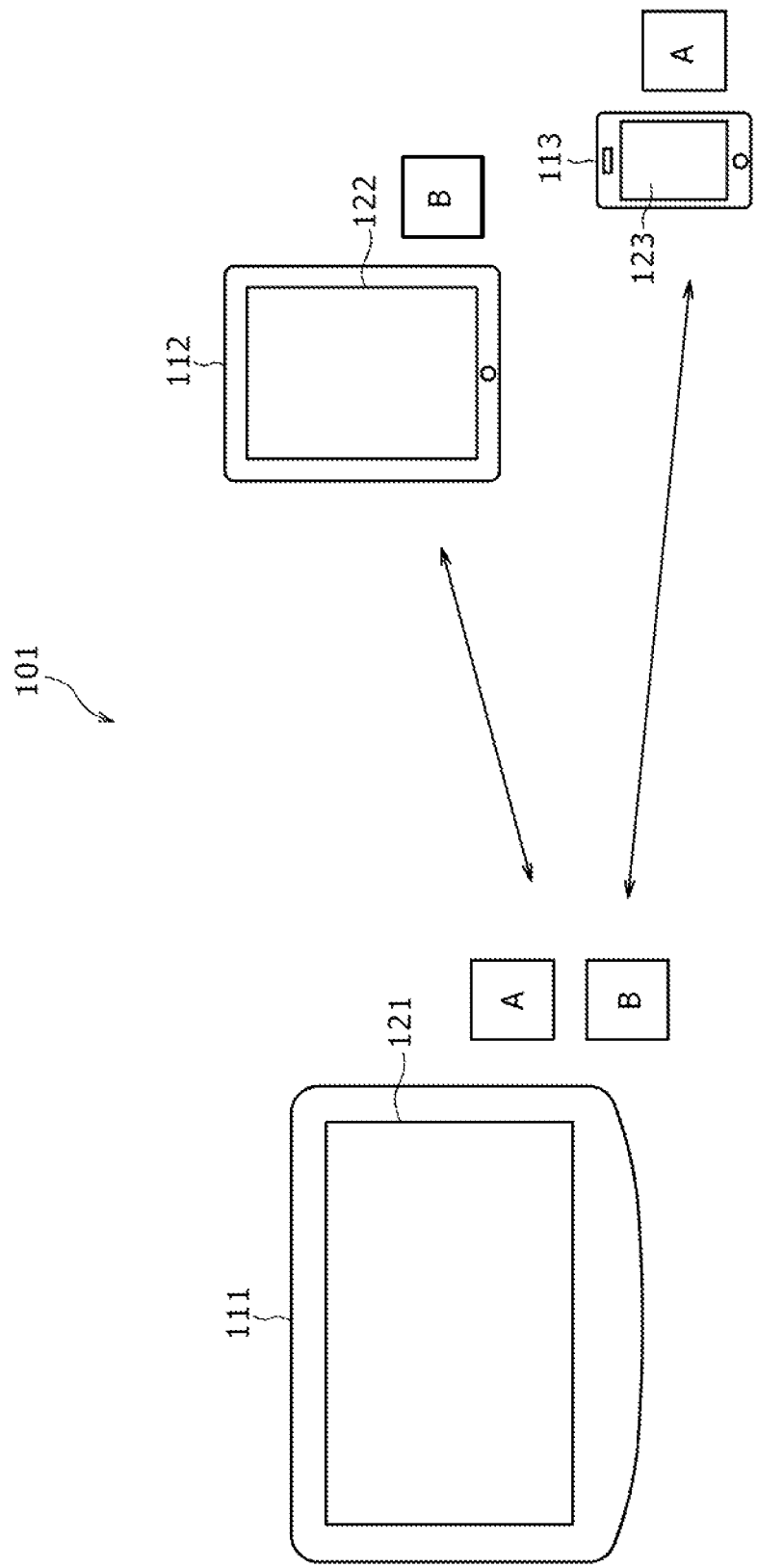
FIG. 1 is a schematic diagram illustrating an exemplary configuration of an information processing system practiced as one embodiment of the present technology.

An information processing system 101 shown in FIG. 1 is configured by including a content reception apparatus 111, a tablet terminal 112, and a mobile telephone having advanced functionality 113 (hereafter simply referred to as a mobile telephone 113).

The content reception apparatus 111 that is one example of a first information processing apparatus based on the present technology is an apparatus configured to receive broadcast content and Internet content, for example has a display 121. The tablet terminal 112 that is one example of a second information processing apparatus based on the present technology is a mobile information terminal called a "tablet terminal" has a display 122. The mobile telephone 113 that is another example of the second information processing apparatus is called a "smartphone" for example. The mobile telephone 113 has advanced functionality that provides not only talk capabilities but also various other capabilities provided by a computer, and has a display 123.

In the information processing system 101, the content reception apparatus 111, the tablet terminal 112, and mobile telephone 113 intercommunicate in a wireless manner.

The display 121 of the content reception apparatus 111 is a public device that is used by all family members of the user. The mobile telephone 113 is a private device that is used only by the user. By contrast, it can be said that the tablet terminal 112 is more private than the content reception apparatus 111 but more public than the mobile telephone 113.

The content reception apparatus 111 has a video browse application and a content reception application, for example. The content reception apparatus 111 further has application A and application B as applications having actions (or functions) allowing the coordination with content being displayed by an active video browsing application.

The tablet terminal 112 has a remote controller application that enables the operation of the content reception apparatus 111, for example. In addition, the tablet terminal 112 has application B as an application having an action (or a function) allowing the coordination with a video browsing application active on the content reception apparatus 111 or the content being displayed thereon.

The mobile telephone 113 has a remote controller application that enables the operation of the content reception apparatus 111, for example. In addition, the mobile telephone 113 has application A as an application that has an action (or a function) allowing the coordination with a video browsing application active on the content reception apparatus 111.

It should be noted that "action" herein denotes an action (or a function) that is done on a device; activating an application with content information or opening a content-associated URL by a browser (or an application), for example. Examples of actions include making a call with a content-associated telephone number, sending facsimile to a content-associated facsimile number, and mailing to a content-associated mail address, among others. Examples of actions further include viewing content-associated images, content-associated moving images, and content-associated sounds by an reproduction application and storing content-associated text information, content-associated images, content-associated moving images, and content-associated sounds into other devices.

The content reception apparatus 111, the tablet terminal 112, and the mobile telephone 113 each have a content coordination application. A content coordination application denotes an application that acquires, from a paired device, information about an action that can be coordinated with a situation (namely, content being displayed or an active application) of the content reception apparatus 111 and causes a corresponding device to execute a user-desired action (or function) on the basis of the obtained information.

It should be noted that, because the content reception apparatus 111, the tablet terminal 112, and the mobile telephone 113 are different from each other in function, the content-associated application running on the content reception apparatus 111 referred to as a master-side content coordination application for the purse of distinction. On the other hand, the content coordination applications running on the tablet terminal 112 and the mobile telephone 113 are referred to as slave-side content coordination applications.

Through the tablet terminal 112 or the mobile telephone 113 on which the remote controller application is running, the user operates a content-coordination key displayed on the display 122 or the display 123 to activate the master-side content coordination application.

It should be noted that the tablet terminal 112 and the mobile telephone 113 located within a wireless communication range of the content reception apparatus 111 are assumed to have been paired (or authenticated for communication) with the content reception apparatus 111.

Receiving a content coordination key from the tablet terminal 112 or the mobile telephone 113 for example, the content reception apparatus 111 activates the master-side content coordination application to acquire the information about the paired tablet terminal 112 and the mobile telephone 113.

Next, on the basis of the obtained information, the content reception apparatus 111 requests the paired tablet terminal 112 and mobile telephone 113 for information about an action (to be specific, an application having that action) that can be coordinated with the content being displayed. Further, the content reception apparatus 111 acquires information about an own action (to be specific, an application having that action) that can be coordinated with the content being displayed.

The information about an action that can be coordinated with the content being displayed is hereafter referred to as content coordination action information.

On the basis of the content coordination action information received from the tablet terminal 112 and the mobile telephone 113 and the information about own content coordination application, the content reception apparatus 111 generates a list of applications having actions that can be coordinated with the content being displayed. The content reception apparatus 111 displays the generated list of applications onto the display 121.

The content reception apparatus 111 receives application select information from the tablet terminal 112 or the mobile telephone 113 for example. The application select information includes a coordination command in the selected application for an action to be coordinated with the content being displayed and the information about an application having that action and the information about a device. In the selected application, the content reception apparatus 111 transmits the coordination command for the action to be coordinated with the content being displayed to the device corresponding to the selected application.

In response to a user operation, the tablet terminal 112 or the mobile telephone 113 transmits a content coordination key for activating the master-side content coordination application. In response to a request for content coordination action information from the content reception apparatus 111, the tablet terminal 112 or the mobile telephone 113 activates the slave-side content coordination application and transmits the information about the content coordination action to the content reception apparatus 111.

In response to a user operation of an operation key displayed on the display 122 or the display 123, the tablet terminal 112 or the mobile telephone 113 selects a user-desired application from among the list of applications displayed on the display 121 of the content reception apparatus 111. The tablet terminal 112 or the mobile telephone 113 transmits the select information to the content reception apparatus 111.

Next, if a coordination command for the action to be coordinated with the content being displayed comes from the content reception apparatus 111, then the tablet terminal 112 and the mobile telephone 113 execute the received coordination command.

Consequently, the action coordinated with the content being displayed (namely, the content of the application being executed) on the content reception apparatus 111, for example, is executed on a desired device.

It should be noted that, in the example shown in FIG. 1, two devices, namely, the tablet terminal 112 and the mobile telephone 113, are shown as the devices paired with the content reception apparatus 111; however, it is also practicable to arrange more than two devices. It should also be noted that the tablet terminal 112 and the mobile telephone 113 are both mobile terminals; however, it is also practicable to use terminals of other types. That is, each device paired with the content reception apparatus 111 may be either an information processing apparatus such as a personal computer or another content reception apparatus.

[Exemplary Configuration of Content Reception Apparatus]

Figure 2:
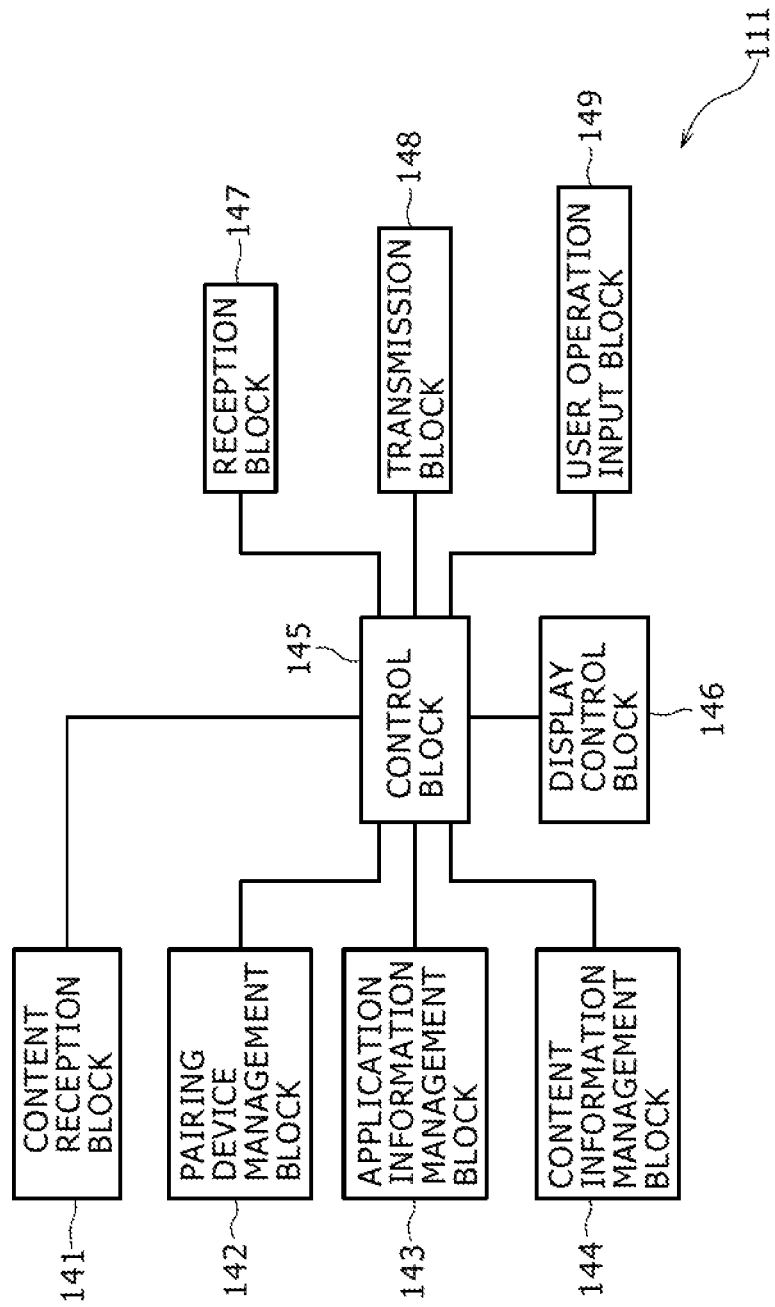
FIG. 2 is a block diagram illustrating an exemplary configuration of a content reception apparatus.

Referring to FIG. 2, there is shown a block diagram illustrating an exemplary configuration of the content reception apparatus.

In the example shown in FIG. 2, the content reception apparatus 111 is configured by including a content reception block 141, a pairing device management block 142, an application information management block 143, a content information management block 144, and a control block 145. In addition, the content reception apparatus 111 is configured by including a display control block 146, a reception block 147, a transmission block 148, and a user operation input block 149.

Under the control of the control block 145, the content reception block 141 receives broadcast content and Internet content and outputs the received content to the control block 145.

The pairing device management block 142 stores and manages such information about a paired device as IP address, MAC address, nickname, terminal name, and OS version, for example, of a device paired with the content reception apparatus 111.

The application information management block 143 stores and manages the information about an application installed (namely, held by the content reception apparatus 111) on the content reception apparatus 111. This application information includes application name, identification ID, type of coordinatable content, and name of coordination function.

The content information management block 144 stores and manages an application being executed by the control block 145, type of content, and name of content as the information about the content being displayed on the display 121.

A user operation entered through the user operation input block 149 or a user operation or information entered through the tablet terminal 112 or the mobile telephone 113 received by the reception block 147 and entered in the control block 145. In accordance with the entered user operation and information, the control block 145 executes an application managed by the application information management block 143, hereby controlling each functional block of the content reception apparatus 111.

For example, by executing an application for receiving content, the control block 145 controls the content reception block 141 to receive content, execute predetermined signal processing on the received content, output an image generated after processing the content to the display control block 146, and display the image onto the display 121.

In addition, in accordance with the content coordination key received by the control block 145, the control block 145 executes content coordination application and functions as described later with reference to FIG. 3 to control functional blocks, thereby executing content coordination processing, for example.

Under the control of the control block 145, the display control block 146 displays an image and a GUI (Graphical User Interface) onto the display 121.

The reception block 147 receives, in a wireless manner, information from the tablet terminal 112 and the mobile telephone 113 located within the wireless communication range and supplies the received information to the control block 145.

Under the control of the control block 145, the transmission block 148 transmits, in a wireless manner, information for pairing with the tablet terminal 112 and the mobile telephone 113 located within the wireless communication range and transmits information to the already paired tablet terminal 112 and the mobile telephone 113.

The user operation input block 149 is configured by a remote controller and buttons, not shown, for example, and supplies an operation signal corresponding to a user operation to the control block 145.

[Exemplary Functional Configuration of Control Block]

Figure 3:
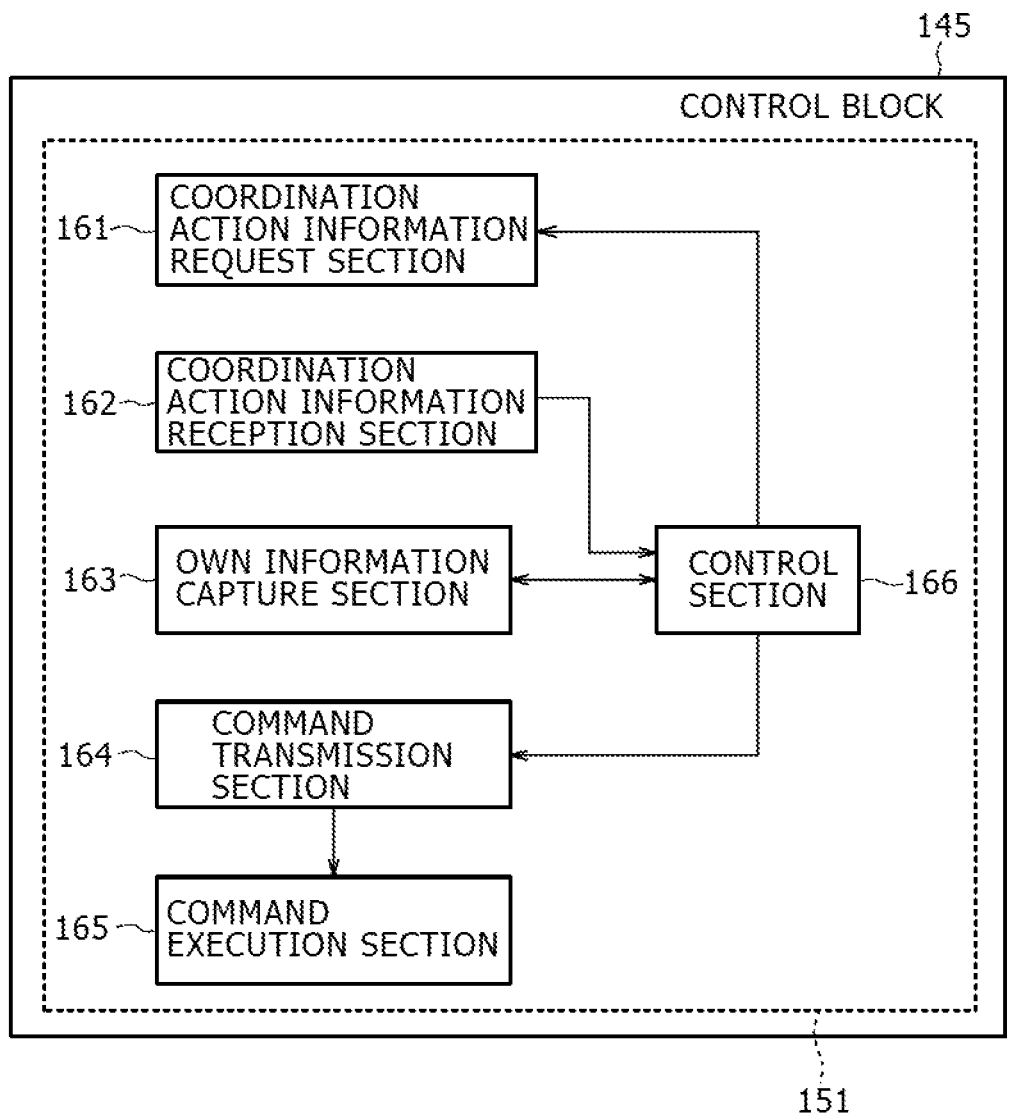
FIG. 3 is a block diagram illustrating an exemplary functional configuration of a control block.

Referring to FIG. 3, there is shown an exemplary functional configuration of the control block. It should be noted that, in the control block 145 shown in FIG. 3, a master-side content coordination application 151 is being executed.

In the example shown in FIG. 3, the control block 145 is configured by including blocks that function by the execution of the master-side content coordination application 151. To be more specific, the control block 145 is configured by including a coordination action information request section 161, a coordination action information reception section 162, a own information capture section 163, a command transmission section 164, a command execution section 165, and a control section 166.

Under the control of the control section 166, the coordination action information request section 161 acquires information about a paired apparatus managed by the pairing device management block 142. On the basis of the obtained information, the coordination action information request section 161 requests the paired apparatus for the information about an application via the transmission block 148.

At this moment, the coordination action information request section 161 acquires the information about content being displayed and managed by the content information management block 144 and transmits the obtained information. Consequently, the coordination action information request section 161 can request content coordination action information that is the information about an application having an action coordinatable with the contents being displayed (with the application being executed).

The coordination action information reception section 162 acquires content coordination action information from the paired tablet terminal 112 and mobile telephone 113 received by the reception block 147 and supplies the obtained information.

Under the control of the control section 166, the own information capture section 163 acquires content coordination action information on the basis of the information about the content managed by the content information management block 144 and supplies the obtained information to the control section 166.

Under the control of the control section 166, the command transmission section 164 transmits, via the transmission block 148, a content-coordination command for executing an action of the device selected by the user. It should be noted that, if the apparatus selected by the user is the content reception apparatus 111 (own), then the command transmission section 164 supplies the content coordination command to the command execution section 165.

The command execution section 165 executes the coordination command received from the command transmission section 164. That is, the command execution section 165 executes an action by the coordination command.

The content coordination action information about a paired apparatus from the coordination action information reception section 162 and the content coordination action information from the own information capture section 163 are supplied to the control section 166. The control section 166 controls the display control block 146 to generate a list of applications (hereafter referred to as a list of coordinatable applications) that have actions coordinatable with the content being displayed on the basis of the supplied information and display the generated list on the display 121.

When the user operates the tablet terminal 112 or the mobile telephone 113, the information about an application selected from the list of coordinatable applications displayed on the display 121 is supplied to the control section 166 via the reception block 147. The control section 166 controls the command transmission section 164 and, on the basis of the information supplied from the reception block 147, transmits a content coordination command in the selected application to a device to which the selected application corresponds.

[Exemplary Configuration of Tablet Terminal]

Figure 4:
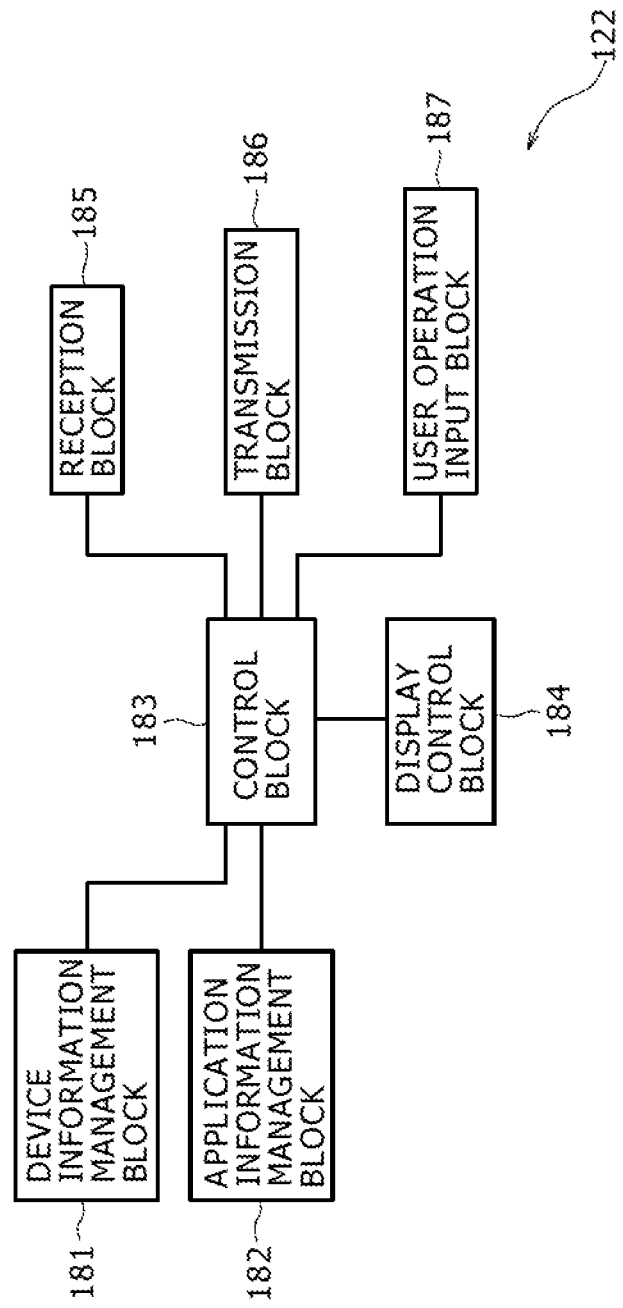
FIG. 4 is a block diagram illustrating an exemplary configuration of a tablet apparatus.

Referring to FIG. 4, there is shown an exemplary configuration of the tablet terminal.

The tablet terminal 112 shown in FIG. 4 is configured by including a device information management block 181, an application information management block 182, a control block 183, a display control block 184, a reception block 185, a transmission block 186, and a user operation input block 187.

The device information management block 181 stores and manages IP address, MAC address, nickname, terminal name, and OS version, for example, as own device information. These items of information are read at the time of wireless communication pairing to be transmitted to the device (namely the content reception apparatus 111) with which pairing is made.

The application information management block 182 stores and manages the information about an application installed in the tablet terminal 112 (namely, held in the tablet terminal 112). This application information includes application name, icon image data, identification ID, and type of coordinatable content.

A user operation entered from the user operation input block 187 and information from the content reception apparatus 111 received by the transmission block 186 are entered in the control block 183. In accordance with the entered user operation and information, the control block 183 executes the application managed by the application information management block 182 to control functional blocks of the tablet terminal 112.

For example, in accordance with the entered user operation, the control block 183 executes the remote controller application to control functional blocks by functioning as will be described later with reference to FIG. 5, thereby transmitting the operation information corresponding to the user operation to a target device (the content reception apparatus 111 for example).

Further, for example, in response to a content coordination action information request from the content reception apparatus 111, the control block 183 executes the slave-side content coordination application to control functional blocks by functioning as will be described later with reference to FIG. 5, thereby executing content coordination processing.

Under the control of the control block 183, the display control block 184 displays an image and a GUI on the display 122.

Through wireless communication, the reception block 185 receives information from the content reception apparatus 111 and the mobile telephone 113 located within the wireless communication range and supplies the received information to the control block 183.

Under the control of the control block 183, the transmission block 186 transmits, in a wireless communication manner, information for the pairing with the content reception apparatus 111 located within the wireless communication area and information to the paired content reception apparatus 111.

The user operation input block 187 is configured by a touch panel laminated on the display 122 and a track ball arranged on the housing, for example, and supplies an operation signal corresponding to a user operation to the control block 183.

[Example Functional Configuration of Control Block]

Referring to FIG. 5, there is shown an exemplary functional configuration of the control block. It should be noted that a remote controller application 191 and a slave-side content coordination application 192 have been executed on the control block 183 shown in FIG. 5.

In the example shown in FIG. 5, the control block 183 is configured by including an operation information transmission section 201 that functions by the execution of the remote controller application 191. In addition, the control block 183 is configured by including a coordination action information transmission section 202 and a command execution section 203 that function by the execution of a slave-side content coordination application 192.

The operation information transmission section 201 controls the transmission block 186 to transmit operation information corresponding to a user operation done through the user operation input block 187 to the content reception apparatus 111. For example, in response to a user operation, the operation information transmission section 201 transmits a content coordination key for activating the master-side content coordination application 151. In addition, in response to a user operation, the operation information transmission section 201 transmits application select information for a user-desired application to be selected from an application list displayed on the content reception apparatus 111 by the master-side content coordination application 151, for example.

It should be noted that a request for content coordination action information from the content reception apparatus 111 is supplied from the reception block 185 to the control block 183, for example. In response, the slave-side content coordination application 192 is activated in the control block 183 to function the coordination action information transmission section 202 and the command execution section 203.

In response to the request received by the reception block 185, the coordination action information transmission section 202 acquires content coordination action information from the application information management block 182. The coordination action information transmission section 202 controls the transmission block 186 to transmit the obtained content coordination action information to the requesting content reception apparatus 111.

When a coordination command is received from the content reception apparatus 111 and the received coordination command is supplied from the reception block 185, the command execution section 203 executes the supplied coordination command. That is, the command execution section 203 executes a coordinatable action by the supplied coordination command.

It should be noted that, in the above description, the slave-side content coordination application 192 is activated when a request for content coordination action information is received through the reception block 185; however, it is also practicable to activate the slave-side content coordination application 192 by a user operation in advance.

In the examples shown in FIG. 4 and FIG. 5, an exemplary configuration of the tablet terminal 112 is shown; the mobile telephone 113 has generally the same configuration as that of the tablet terminal 112 described with reference to FIG. 4 and FIG. 5 except for a telephone function. Therefore, the block diagrams shown in FIG. 4 and FIG. 5 are used for an exemplary configuration of the mobile telephone 113.

However, in some cases, the remote controller application 191 has not been executed in the tablet terminal 112 and the mobile telephone 113. In this case, the control block 183 may be configured by including only the coordination action information transmission section 202 and the command execution section 203 that function by the execution of the slave-side content coordination application 192.

[Operation of Information Processing System]

Figure 6:
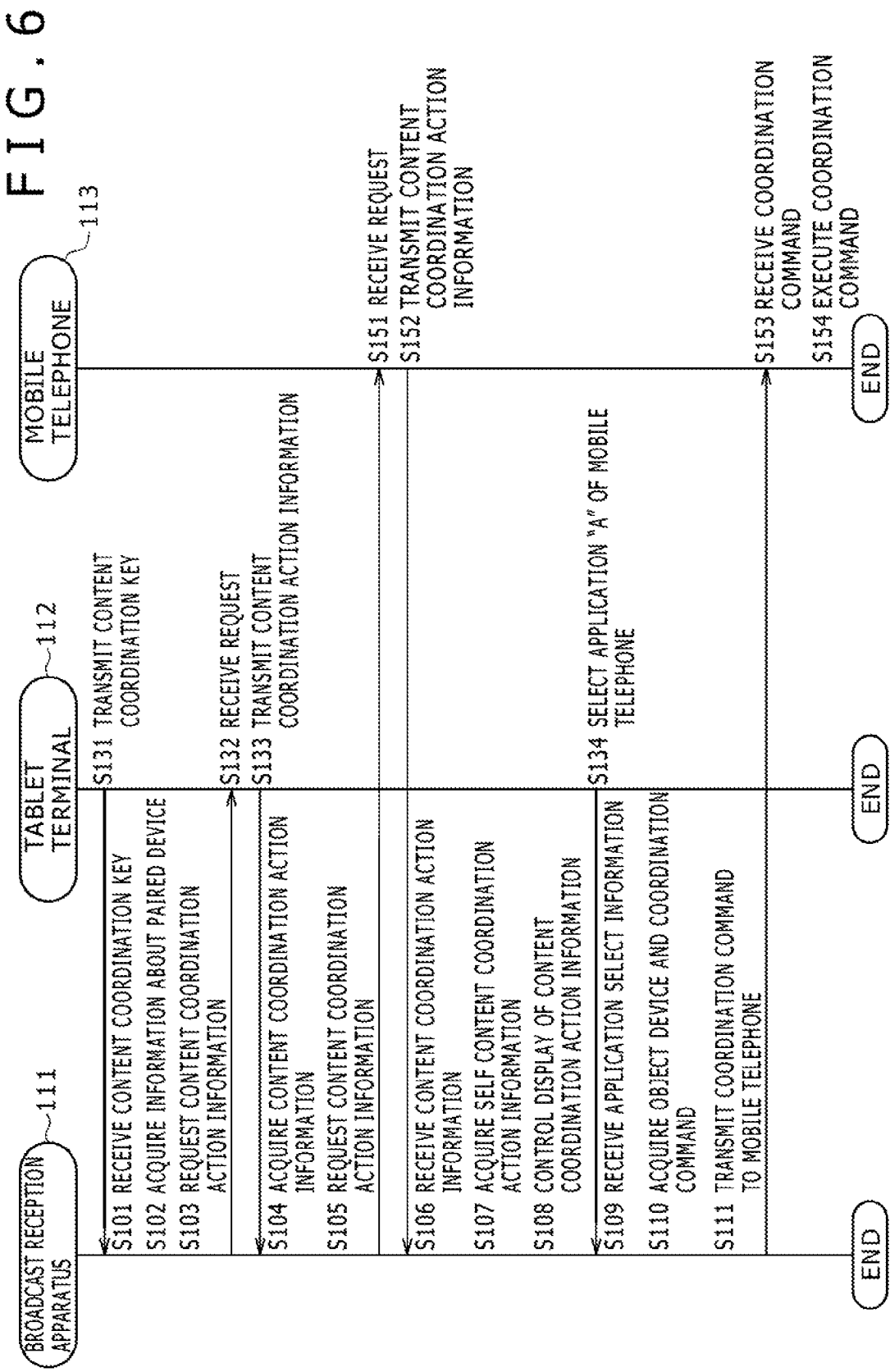
FIG. 6 is flowchart indicative of operations of the information processing system.

The following describes the processing to be executed by the information processing system 101 with reference to the flowchart shown in FIG. 6. It should be noted that the content reception apparatus 111 is assumed to have been paired with the tablet terminal 112 and the mobile telephone 113.

For example, it is assumed that a user sit on a sofa and be looking at the display 121 of the content reception apparatus 111 while operating the content reception apparatus 111 through the remote controller application 191 being executing on the tablet terminal 112. It is also assumed that the mobile telephone 113 be in a pocket of the user's pants.

In the content reception apparatus 111, an application for receiving content has been executed and the content (a travel program for example) received by the content reception block 141 is being displayed on the display 121, for example.

Because the user wants to travel to Hawaii when the user is looking at the travel program in which Hawaii is shown, the user wants to clip (or store) information on Hawaii shown in the program into a note application designed to accumulate various kinds of information jotted down by the user.

It should be noted that the note application is not installed on the tablet terminal 112 but has been installed on the content reception apparatus 111 and the mobile telephone 113. However, the note application in the content reception apparatus 111 is of the account of the user's father and, when the note application is activated, the travel program currently being viewed is gets behind the activated note application, so that the user wants to clip the information about Hawaii into the note application installed in the user's own mobile telephone 113.

Figure 7:
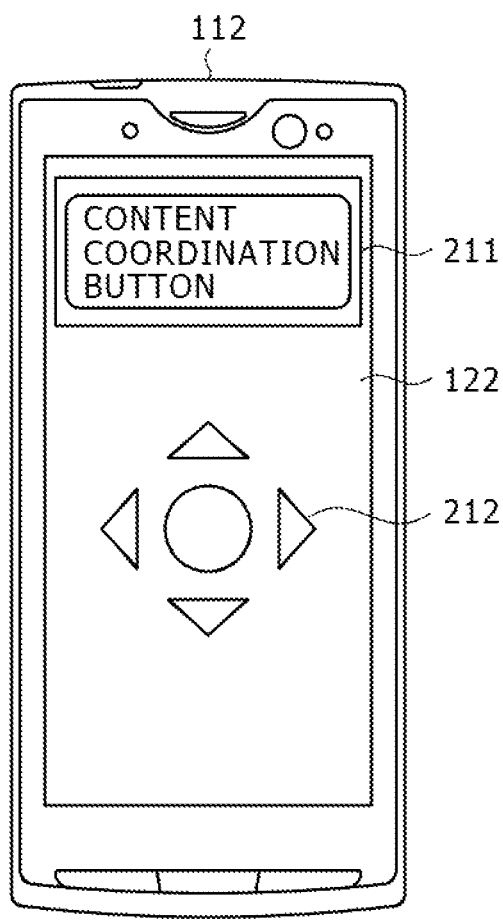
FIG. 7 is a diagram illustrating a top view of a remote controller indicative of a display example on a display in which a remote controller application is active.

Therefore, the user clicks a content coordination button by use of the remote controller application 191 of the tablet terminal 112. That is, when the remote controller application 191 is activated, the display control block 184 displays a content coordination button 211 and an operation button 212 shown in FIG. 7 onto the display 122 under the control of the 183.

The content coordination button 211 is clicked to activate the master-side content coordination application 151 of the content reception apparatus 111. The operation button 212 is used to operate a GUI (a list of coordinatable applications to be described later for example) displayed on the content reception apparatus 111 and configured by up, down, left and right buttons, and an enter button.

The user clicks the content coordination button 211 displayed on the display 122. In response, the user operation input block 187 of the tablet terminal 112 supplies an operation signal corresponding to the click on the content coordination button 211 by the user to the operation information transmission section 201.

Referring to FIG. 6 again, the operation information transmission section 201 of the tablet terminal 112 controls the transmission block 186 to transmit a content coordination key in response to the operation signal received from the user operation input block 187. The transmission block 186 transmits the content coordination key in a wireless manner.

In step S101, the reception block 147 of the content reception apparatus 111 receives the content coordination key and supplies the received content coordination key to the control block 145. In response, the control block 145 activates the master-side content coordination application 151 to function the functional blocks shown in FIG. 3.

In step S102, the coordination action information request section 161 of the content reception apparatus 111 acquires information about paired devices from the pairing device management block 142 under the control of the control section 166.

In step S103, on the basis of the obtained information, the coordination action information request section 161 requests the tablet terminal 112 of the paired devices for content coordination action information through the transmission block 148 in a wireless manner. It should be note that, at this moment, the coordination action information request section 161 acquires information about content being displayed managed by the content information management block 144 and transmits the obtained information, thereby requesting for the content coordination action information coordinatable to that content.

In step S132, the reception block 185 of the tablet terminal 112 receives the request for content coordination action information from the content reception apparatus 111 and supplies the received information to the control block 183. In response, the control block 183 activates the slave-side content coordination application 192 to function some functional blocks shown in FIG. 5.

The coordination action information transmission section 202 of the tablet terminal 112 acquires the content coordination action information from the application information management block 182. In step S133, the coordination action information transmission section 202 controls the transmission block 186 to transmit the obtained content coordination action information to the requesting content reception apparatus 111 in a wireless manner.

The content coordination action information is configured by a table listing serial numbers, identifications ID, application names, coordination function names, account information, and icon image data information as shown in FIG. 8, for example. All information in the table shown in FIG. 8 is character information.

First, it is shown that the content coordination action information having serial number=1 has identification ID=3, application name=AAA, coordination function name PPPP, account information=Tom Brown, and icon image data information XXXX.

The content coordination action information having serial number=2 has identification ID=5, application name=BBB, coordination function name QQQQ, account information=none, and icon image data information YYYY.

The content coordination action information having serial number=3 has identification ID=13, application name=CCC, coordination function name RRRR, account information=Tom Brown, and icon image data information ZZZZ.

The content coordination action information having serial number=4 has identification ID=16, application name=DDD, coordination function name SSSS, account information=none, and icon image data information=none.

It should be noted that identification ID is used for the OS of the tablet terminal 112 (or the display 123) to uniquely identify an application thereof. The application name is the name of an application that can be seen by the user (for understanding).

Coordination function name is a text to be displayed when an application concerned is displayed in a list. For example, this text may be "paste content to ◯◯," "tweet," or "create ◯◯."

Account information is indicative of an account name with which an application concerned logs in. Icon image data information is information about an icon image file path or information about text data obtained by applying base 64 conversion for example on icon image data.

Referring to FIG. 6 again, in step S133, content coordination action information comes from the tablet terminal 112. In response, the coordination action information reception section 162 of the content reception apparatus 111 acquires the content coordination action information from the tablet terminal 112 through the reception block 147 in step S104. The coordination action information reception section 162 supplies the obtained content coordination action information to the control section 166.

In step S105, the coordination action information request section 161 requests a mobile telephone 123 of the paired devices for content coordination action information through the transmission block 148 on the basis of the obtained information. It should be noted that, at time moment, the coordination action information request section 161 acquires the information about the content being displayed managed by the content information management block 144 and transmits the obtained information, thereby requesting for content coordination action information coordinatable with the content being displayed.

In step S151, the reception block 185 of the mobile telephone 123 receives the request for content coordination action information from the content reception apparatus 111 and supplies the received information to the control block 183. In response, the control block 183 activates the slave-side content coordination application 192 to function some functional blocks shown in FIG. 5.

The coordination action information transmission section 202 of the mobile telephone 123 acquires content coordination action information from the application information management block 182. In step S152, the coordination action information transmission section 202 controls the transmission block 186 to transmit the obtained content coordination action information to the requesting content reception apparatus 111 in a wireless manner.

In response, in step S106, the coordination action information reception section 162 of the content reception apparatus 111 receives the content coordination action information from the mobile telephone 123 through the reception block 147 and supplies the received content coordination action information to the control section 166.

In step S107, the own information capture section 163 of the content reception apparatus 111 acquires content coordination action information from the application information management block 143 under the control of the control section 166 and supplies the obtained content coordination action information to the control section 166. It should be noted that, at this moment, the information about the content being displayed managed by the content information management block 144 is referenced.

Consequently, in the control section 166, the content coordination action information of the content reception apparatus 111, the content coordination action information of the tablet terminal 112, and the content coordination action information of the mobile telephone 113 are obtained.

In step S108, the control section 166 controls the display control block 146 to control display of the content coordination action information on the basis of the supplied information. To be more specific, the control section 166 makes the display control block 146 generate a list of applications coordinatable with the content being displayed and display the generated list on the display 121. It should be noted that, in the example shown in FIG. 6, an example in which the list of applications coordinatable with the content reception apparatus 111 is generated was described; however, it is also practicable to make the display control block 146 display a list of applications coordinatable with the tablet terminal 112 from which a content coordination key has been transmitted.

Figure 9:
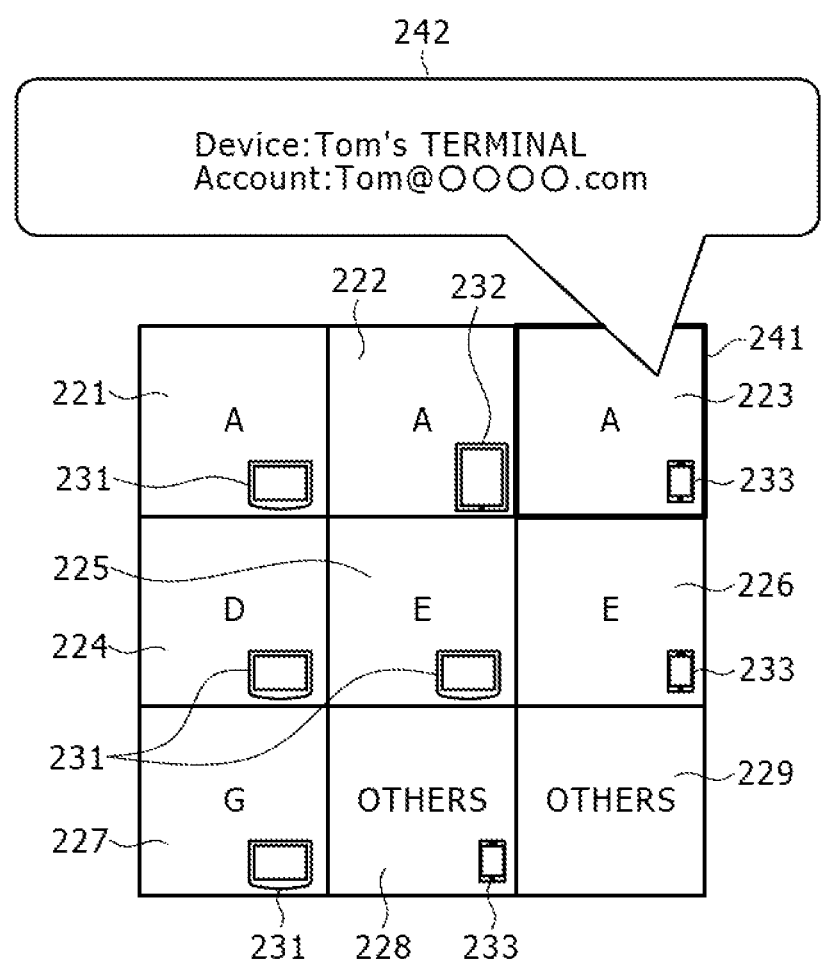
FIG. 9 is a diagram illustrating an exemplary list of applications that can be coordinated with content being displayed on the content reception apparatus.

Referring to FIG. 9, an exemplary list of coordinatable applications that are displayed on the display 121 of the content reception apparatus 111. This list of coordinatable applications is displayed approximately in the lower left corner of the display 121, for example.

In the example shown in FIG. 9, icon images 221 through 229 indicative of applications coordinatable with the content being displayed or that there are applications other than those displayed here are arranged in three vertical columns and three horizontal rows.

The icon images 221 through 223 correspond to application A. At the lower right of the icon image 221, an icon image 231 corresponding to the content reception apparatus 111 is displayed to allow the user to understand that the icon image 221 is indicative of application A of the content reception apparatus 111.

At the lower right of the icon image 222, an icon image 232 corresponding to the tablet terminal 112 is displayed to allow the user to understand that the icon image 222 is indicative of application A of the tablet terminal 112. At the lower right of the icon 223, an icon image 233 corresponding to the mobile telephone 113 is displayed to allow the user to understand that the icon image 223 is indicative of application A of the mobile telephone 113.

The icon image 224 corresponds to application D. At the lower right of the icon image 224, an icon image 231 corresponding to the content reception apparatus 111 is displayed to allow the user to understand that the icon 224 is indicative of application D of the content reception apparatus 111.

The icon images 225 and 226 correspond to application E. At the lower right of the icon 225, an icon image 231 corresponding to the content reception apparatus 111 is displayed to allow the user to understand that the icon image 225 is indicative of application E of the content reception apparatus 111. At the lower right of the icon image 226, an icon image 233 corresponding to the mobile telephone 113 is displayed to allow the user to understand that the icon image 224 is indicative of application E of the mobile telephone 113.

The icon image 227 corresponds to application G. At the lower right of the icon image 227, an icon image 233 corresponding to the mobile telephone 113 is displayed to allow the user to understand that the icon image 227 is indicative of application G of the mobile telephone 113.

The icon images 228 and 229 are indicative that there are applications other than displayed. At the lower right of the icon image 228, the icon image 233 corresponding to the mobile telephone 113 is displayed to allow the user to understand that the mobile telephone 113 has applications other than displayed. At the lower right of the icon image 229, nothing is displayed to allow the user to understand that any one of the devices has applications other than displayed.

In addition, in the example shown in FIG. 9, a cursor 241 is shown for the icon image 223. For example, the cursor 241 can be moved to another icon image when the user operates the up, down, left or right button of the operation button 212 displayed on the display 122 by the remote controller application 191 of the tablet terminal 112.

On the icon image 223 selected by the cursor 241, a balloon 242 in which detail information associated with application A corresponding to the icon 223 is shown is displayed. In the example shown in FIG. 9, the balloon 242 has "Tom' terminal" indicative of the name of device having application A corresponding to the icon image 223 and "Tom@○○○○.com" indicative the account of application A corresponding to the icon image 223.

If, with the icon image operator block 223 selected by the cursor 241, the user presses the enter button of the operation button 212 displayed on the display 122 by the remote controller application 191 of the tablet terminal 112, then the coordination with application A corresponding to the operator block 223 is determined.

In addition, if the icon 228 or the icon 229 indicative of applications other than indicated by the cursor 241 is selected, a balloon 251 in which the icon image 261 through icon image 263 indicative of applications other than displayed is displayed.

Figure 10:
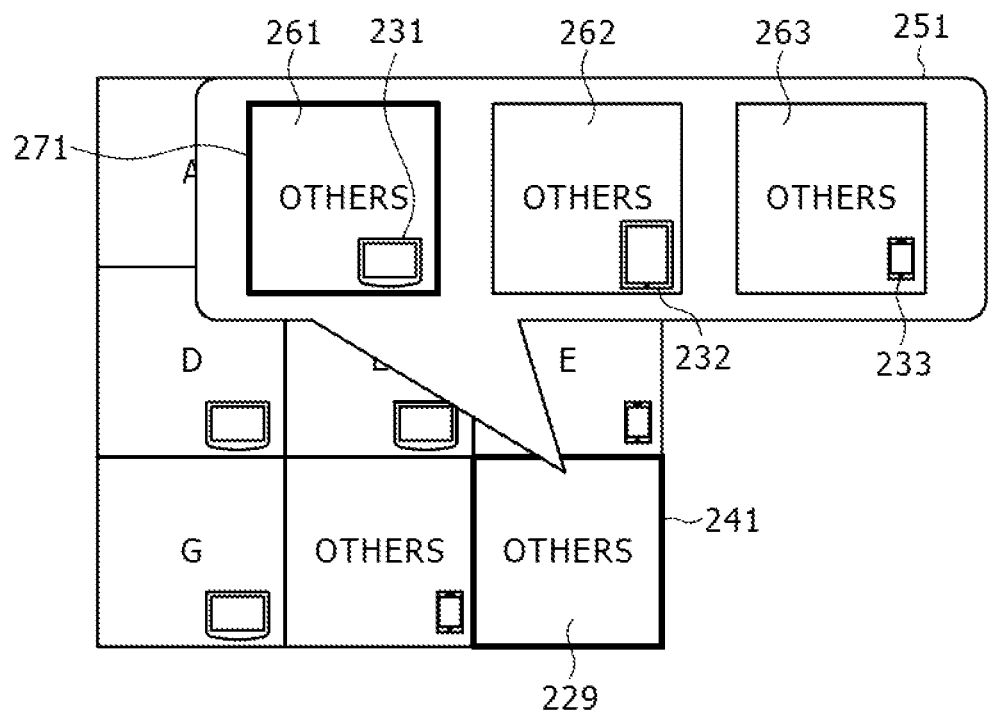
FIG. 10 is a diagram illustrating another exemplary list of applications that can be coordinated with content being displayed on the content reception apparatus.

In the example shown in FIG. 10, the icon image 229 is selected by the cursor 241 and a balloon 251 in which the icon images 261 through 263 are shown is displayed on the selected icon image 229.

The icon images 261 through 263 are indicative that there are applications other than displayed.

At the lower right of the icon image 261, an icon image corresponding to the content reception apparatus 111 is displayed to allow the user to understand that the content reception apparatus 111 has applications other than displayed.

At the lower right of the icon image 262, an icon image 232 corresponding to the tablet terminal 112 is displayed to allow the user to understand that the tablet terminal 112 has applications other than displayed. At the lower right of the icon image 263, an icon image 233 corresponding to the mobile telephone 113 is displayed to allow the user to understand that the mobile telephone 113 has applications other than displayed.

In the example shown in FIG. 10, a cursor 271 is shown in the icon 261. For example, if the user operates the up, down, left or right button of the operation button 212 displayed on the display 122 by the remote controller application 191 of the tablet terminal 112, the cursor 271 can be moved to another icon image.

Figure 11:
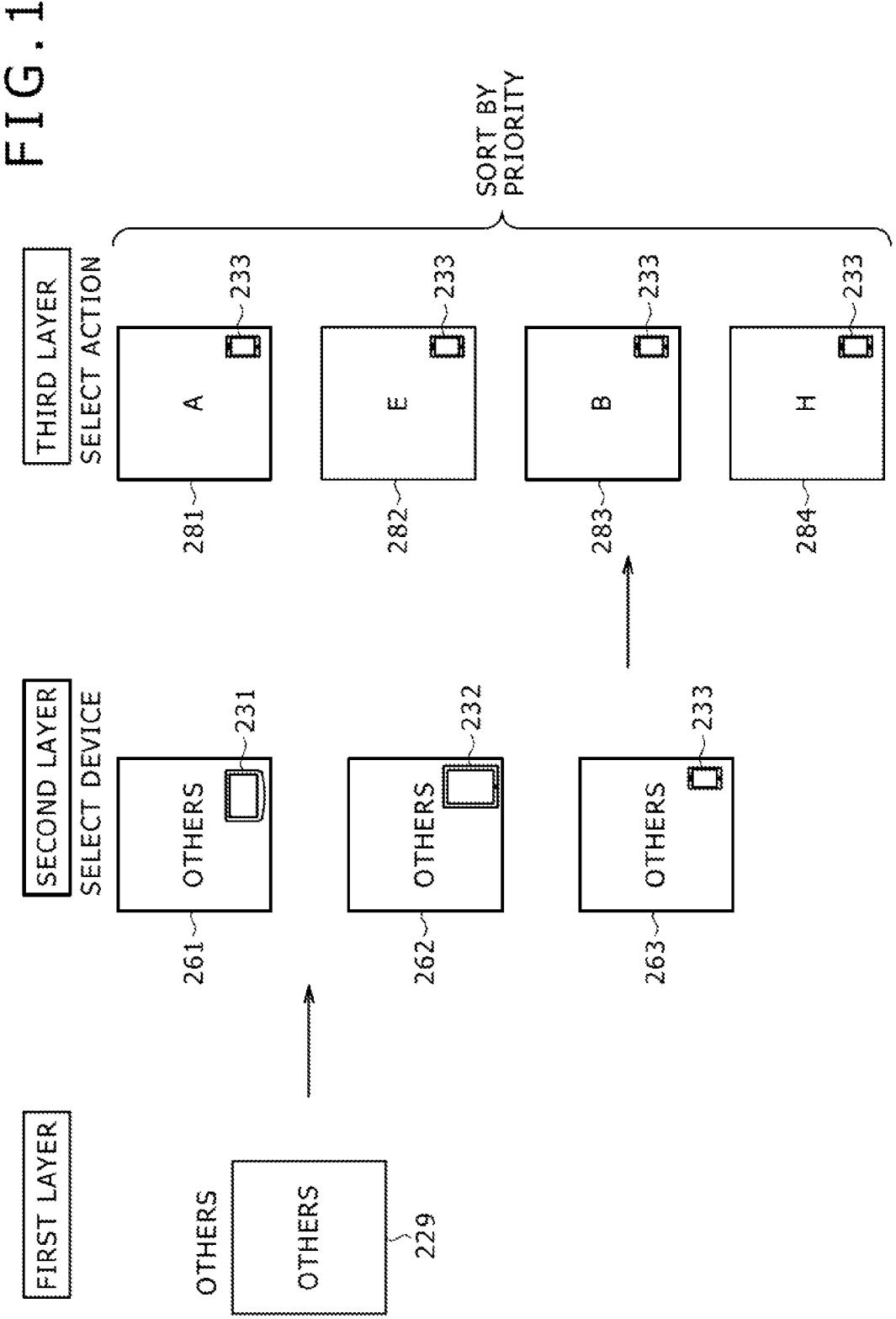
FIG. 11 is a diagram illustrating still another exemplary list of applications that can be coordinated with content being displayed on the content reception apparatus.

The icon image 263 is selected by the cursor 271 and, with the icon image 263 selected, the user presses the enter button of the operation button 212 displayed on the display 122 by the remote controller application 191 of the tablet terminal 112. In response, a list of icon images 281 through 284 corresponding to applications installed on the mobile telephone 113 indicated by the icon image 263 is shown as shown in FIG. 11, for example.

The icon image 281 corresponds to application A. The icon image 282 corresponds to application E. The icon image 283 corresponds to application B. The icon image 284 corresponds to application H.

At the lower right of each of the icon images 281 through 284, an icon image 233 corresponding to the mobile telephone 113 is displayed to allow the user to understand that the icons 281 through 284 are indicative of applications A, E, B, and H, respectively, of the mobile telephone 113.

As described above, in a list of coordinatable applications, each device paired with the content reception apparatus 111 and the applications of actions that are executable by the content reception apparatus 111 itself are collectively displayed.

In this display, if all the applications are not displayed at once due to the design limitations for example of the content reception apparatus 111, then the applications are displayed in a layered manner.

For example, in the list display shown in FIG. 9, there are nine or more coordinatable applications, but there are only nine icon image display frames. In such a case, an icon image (the icon image 228 or 229 shown in FIG. 9) indicative more applications than displayed is displayed in addition to the icon images corresponding to applications on the first layer.

For example, as described above with reference to FIG. 9, if the icon image 229 is selected by the cursor 241 and determined, then the second layer for device selection is displayed as shown in FIG. 11.

On the second layer, the icon images 261 through 263 indicative that there are other applications are displayed on the content reception apparatus 111, the tablet terminal 112, and the mobile telephone 113, respectively.

Then, as described above with reference to FIG. 10, if the icon image 263 for example is selected by the cursor 271 and the enter key is pressed, the third layer for selecting an action (namely, an application having that action) is displayed as shown in FIG. 11.

For the third layer, icon images 281 through 284 corresponding to applications A, E, B, and H, respectively, of the mobile telephone 113 are displayed. It should be noted that these icon images 281 through 284 are sorted by priority before being displayed. Consequently, applications can be selected, device by device.

It should be noted that the displaying of the second and third layers may be as balloons on cursor-selected icons as shown in FIG. 9 and FIG. 10. Further, if the displaying of the second and third layers is determined in a cursor-selected state, this displaying may be done only in the lower layer by disabling the displaying of the upper layer.

In the displaying of a list of coordinatable applications, each application is prioritized for display and applications having higher priorities are displayed on the first layer without being put into the others. The priority is based on user application usage frequency, general popularity, and user setting or default setting, and is subject to change in accordance with various types of information.

It should be noted that, as described above, with all devices (including the content reception apparatus 111) paired with the content reception apparatus 111, coordinatable applications may be prioritized or device filtering may be executed before prioritizing applications.

To be more specific, if each of four family members has a content reception apparatus, a mobile telephone, and a tablet terminal, applications coordinatable on the total of 12 devices are displayed, thereby possibly fairly increasing the number of displays.

So, the priority of a person who is currently operating or the device being operated and the application of a device associated with device being operated may be raised or the applications of other devices may be filtered to prevent these applications from being displayed.

In this prioritization or filtering processing, the person and devices are identifiable by a method in which the person is identified by an image pickup function arranged in the proximity of the display 121 of the content reception apparatus 111 or, because account information is stored in each device, the devices having the same account are identified.

It should be noted that, in FIG. 9 through FIG. 11, icon images for device identification are added to icon images; it is also practicable to add thumbnails or icons of the faces of device owners and accounts. Alternatively, the user may set the selection between device identification icon and owner identification icon, for example.

Further, devices and owners of coordinatable applications may be easily identified with background colors or focus colors rather than adding thumbnails and icons.

It should be noted that the list displays of applications are not limited to those shown in FIG. 9 through FIG. 11. For example, applications may be list-displayed like a menu or displayed in a scroll manner.

Referring to FIG. 6 again, in step S108, the displaying of content coordination action information is controlled to display a list of applications coordinatable with the content being displayed onto the display 121 as described above.

With the icon image 223 selected by the cursor 241 shown in FIG. 9, the user presses the enter button of the operation button 212 displayed on the display 122 by the remote controller application 191 of the tablet terminal 112. In response, the coordination with application A of the mobile telephone 113 corresponding to the icon image 223 is determined.

In step S134 shown in FIG. 6, the operation information transmission section 201 of the tablet terminal 112 controls the transmission block 186 to select application A of the mobile telephone 113 in response to an operation signal from the user operation input block 187. The transmission block 186 transmits the information about selection of application A of the mobile telephone 113 in a wireless manner.

In step S109, the reception block 147 of the content reception apparatus 111 receives the information indicative of the selection of application A of the mobile telephone 113 and supplies the received information about selection of application A of the mobile telephone 113 to the control section 166.

On the basis of the information received from the reception block 147, the control section 166 acquires a target device (the mobile telephone 113 in this example) and a coordination command that provides a coordinatable action in an application (application A in this example). The control section 166 supplies the obtained target device and coordination command to the command transmission section 164.

In step S111, the command transmission section 164 controls the transmission block 148 to transmit the coordination command to the mobile telephone 113 that is the target device in a wireless manner.

In response, the reception block 185 of the mobile telephone 113 receives the coordination command and supplies the received coordination command to the command execution section 203 in step S153.

In step S154, the command execution section 203 of the mobile telephone 113 executes the received coordination command.

To be more specific, when the coordination command is executed, an action is executed in which a note application is activated and Hawaii information in the travel program that is the content of an application that was executed on the content reception apparatus 111 is clipped (or stored) in the note application of the mobile telephone 113.

As described so far, the situation of the content reception apparatus 111, namely, the application executed on the content reception apparatus 111 can be coordinated with the application of the mobile telephone 113.

Consequently, the content information displayed on the content reception apparatus 111 that is a public device can be easily coordinated with an application of a private device without being viewed by other persons.

In addition, in a situation where there are two or more devices and two or more users, the system can be optimized for the user currently using one of the devices.

Figure 12:
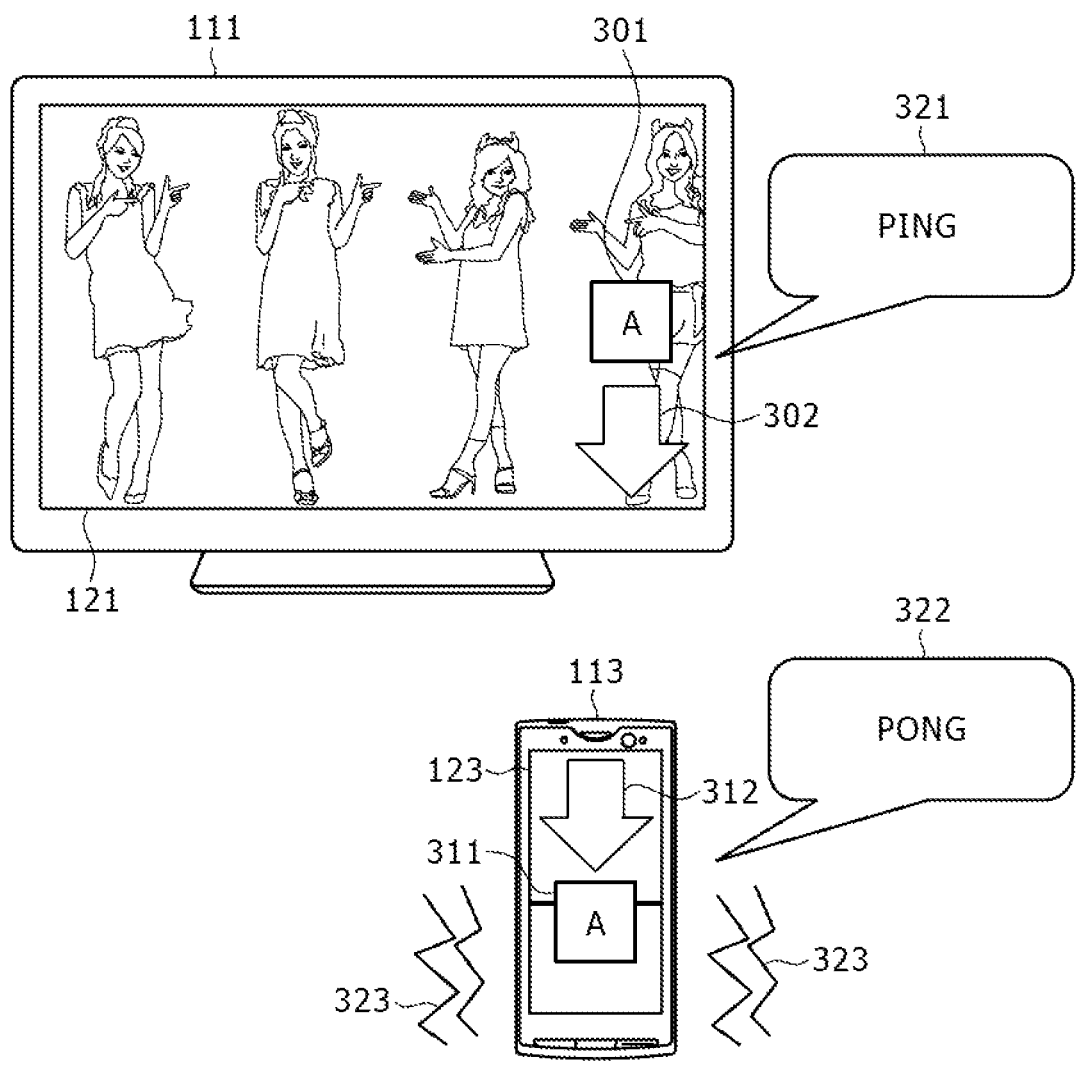
FIG. 12 is a diagram illustrating a display example of the display.

The following describes the above-mentioned processing of step S111 shown in FIG. 6 and the processing of step S153 to be executed in response to the processing of step S111 with reference to FIG. 12. In the example shown in FIG. 12, the content reception apparatus 111 for executing the processing of step S111 and the mobile telephone 113 for executing the processing of step S153 are shown.

To be more specific, in step S111, a coordination command is transmitted to the mobile telephone 113. In this process, the control section 166 of the content reception apparatus 111 controls the display control block 146 to display an animation (or a transition) or a arrow mark 302 for the movement to the outside of the screen of the display 121 in order for an icon image 301 corresponding to selected application A as if to jump to the mobile telephone 113.

In response to the processing of step S111, the coordination command is received by the mobile telephone 113 in step S153. In this process, the control block 183 of the mobile telephone 113 controls the display control block 184 to display an animation (or a transition) or an arrow mark 312 for the movement from the outside of the screen of the display 123 into the inside thereof in order for an icon image 311 corresponding to application A as if to jump in from the content reception apparatus 111.

It is also practicable to output sound "ping" at transmission in the content reception apparatus 111 and sound corresponding "pong" at reception in the mobile telephone 113, for example.

Further, it is practicable to generate vibration 323 at reception in the mobile telephone 113, for example.

The above-mentioned configuration allows the user to better recognize the coordination between applications.

It should be noted that, in the description made above, an example of coordinating the content reception apparatus 111 with an application of the tablet terminal 112 is described; however, it is also practicable to coordinate the content reception apparatus 111 with an application of the tablet terminal 112. In addition, it is also practicable to coordinate the content reception apparatus 111 with an application of the mobile telephone 113 (or the tablet terminal 112) by operating the mobile telephone 113 instead of the tablet terminal 112. Further, it is practicable to coordinate the applications of the content reception apparatus 111 with each other by operating the tablet terminal 112 (or the mobile telephone 113).

In the description made above, an example in which a list of coordinatable applications is displayed on the content reception apparatus 111 is shown. It is also practicable to display a list of coordinatable applications on the tablet terminal 112 or the mobile telephone 113.

It should also be noted that the above-mentioned sequence of processing operations may be executed by software as well as hardware. If the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

2. The Second Embodiment (Computer)
[Exemplary Configuration of Computer]

Figure 13:
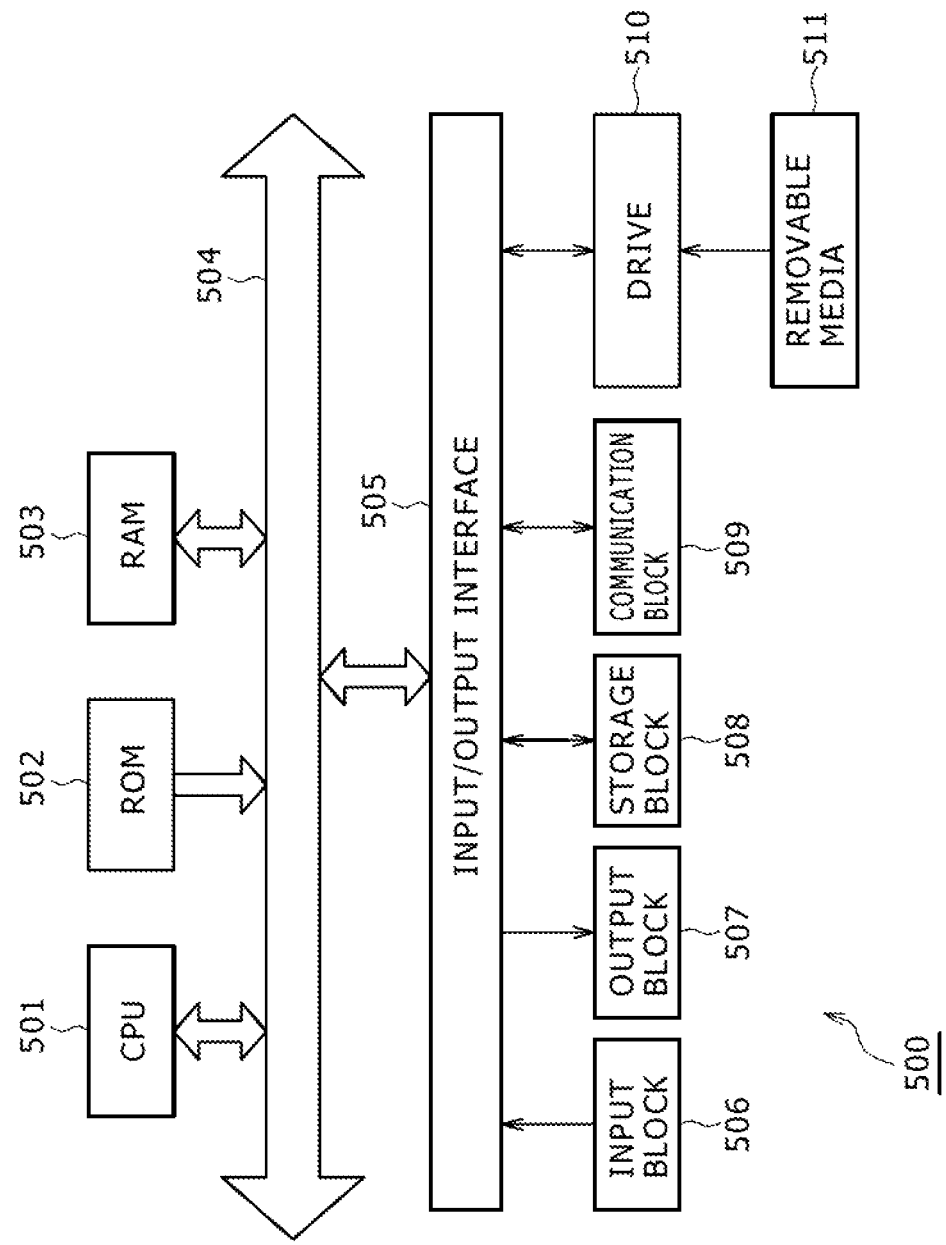
FIG. 13 is a block diagram illustrating an exemplary configuration of a computer.

Referring to FIG. 13, there is shown an exemplary hardware configuration of a computer configured to execute the above-mentioned sequence of processing operations by use of computer programs.

In a computer 500, a CPU (Central Processing Unit) 501, a ROM (Read Only Memory) 502, and a RAM (Random Access Memory) 503 are interconnected by a bus 504.

The bus 504 is connected with an input/output interface 505. The input/output interface 505 is connected with an input block 506, an output block 507, a recording block 508, a communication block 509, and a drive 510.

The input block 506 made up of a keyboard, a mouse, and a microphone, for example. The output block 507 is made up of a display and a speaker, for example. The recording block 508 is made up of a hard disk unit or a nonvolatile memory, for example. The communication block 509 is made up of a network interface, for example. The drive 510 drives a removable media 511 such as a magnetic disk, an optical disk, a magneto-optical disk or a semiconductor memory, for example.

With the computer configured as described above, the CPU 501 loads a program from the recording block 508 into the RAM 503 via the input/output interface 505 and the bus 504 for execution, thereby executing the above-mentioned sequence of processing operations.

Each program to be executed by the computer (or the CPU 501) may be recorded to the removable media 511 that is a package media for example to be provided to the user. In addition, each program may be provided through a wired or wireless transmission media such as a local area network, the Internet, and digital satellite broadcasting.

In the computer, each program may be installed, via the input/output interface 505, in the recording block 508 by loading the removable media 511 in which that program is recorded onto the drive 510. In addition, each program may be received at the communication block 509 via wired or wireless transmission media to be installed in the recording block 508. Further, each program may be installed in the ROM 502 or the recording block 508 in advance.

It should be noted that each program to be executed by the computer 500 may be executed in a time-dependent manner along the sequence described herein, in a parallel manner, or in an on-demand basis.

It should also be noted that, herein, the steps for describing a program recorded to a recording media may include processing to be executed in parallel or individually in addition to processing to be executed in a time-dependent manner in accordance with a sequence described herein.

It should be noted that the embodiments of the present disclosure are not limited to those described above; variations and changes may be added to the embodiments described above as long as no departure is done from the spirit of the present disclosure.

It should also be noted that each of the steps described with reference to with above-mentioned flowchart may be executed by one apparatus or two or more apparatuses in a divided manner.

Further, if two or more processing operations are included in one step, then these processing operations may be executed by two or more apparatuses in a distributed manner in addition to the execution by a single apparatus.

Each configuration described above as one apparatus (or a processing block) may be divided in configuration into two or more apparatuses (or processing blocks). Conversely, a configuration made up of two or more apparatuses (or processing blocks) may be configured as one apparatus (or one processing block). In addition, another configuration may be added to the configuration of each apparatus (or each processing block) described above. Further, if the configuration and operation of the entire system are substantially the same, a part of the configuration of a certain apparatus (or a certain processing block) may be included in the configuration of another apparatus (or another processing block). That is, the present disclosure is not limited to the embodiments described above; therefore, variations and changes may be added to the embodiments described above as long as no departure is done from the spirit of the present disclosure.

The preferred embodiments of the present disclosure have been described above with reference to the accompanying drawings. It will be appreciated that the present disclosure is not limited to the above-described preferred embodiments. It should be understood by those skilled in the art that various modifications, combinations, sub-combinations and alterations may occur depending on design requirements and other factors insofar as they are within the scope of the appended claims or the equivalents thereof.

It should be noted that the present technology may take the following configuration.

(1) An information processing system including:
a first information processing apparatus; and
a second information processing apparatus, wherein
the first information processing apparatus has
an application information request block configured to request a second information processing apparatus for information about a coordinatable application in response to a user operation,
an application information reception block configured to receive the information about the application of the second information processing apparatus transmitted from the second information processing apparatus in response to the request from the application information request block, and
a command transmission section configured to transmit a command for executing a user-specified application among coordinatable applications to the second information processing apparatus corresponding to the user-specified application on the basis of the information of the application of the second information processing apparatus received by the application information reception block, and
the second information processing apparatus has
an application information transmission block configured to transmit the information about the application of the second information processing apparatus requested by the application information request block to the first information processing apparatus, and
a command execution block configured to execute the command transmitted by the command transmission section.

(2) An information processing apparatus including:
an application information request block configured to request other information processing apparatuses for information about a coordinatable application in response to a user operation;
an application information reception block configured to receive the information about the applications of the other information processing apparatuses transmitted from the other information processing apparatuses in response to the request by the application information request block; and
a command transmission section configured to transmit a command for executing a user-specified application among coordinatable applications to the other information processing apparatuses corresponding to the user-specified application on the basis of the information of the application of the other information processing apparatuses received by the application information reception block.

(3) The information processing apparatus according to (2) above, wherein the application information request block requests for information about an application that is coordinatable with a situation in the information processing apparatus.

(4) The information processing apparatus according to (2) or (3) above, further including:
a display control block configured to display a list of the coordinatable applications on the basis of the information about the applications of the other information processing apparatuses received by the application information reception block.

(5) The information processing apparatus according to (4) above, wherein the display control block displays the list of applications in accordance with priorities of the applications.

(6) The information processing apparatus according to (5) above, wherein the priorities of the applications are changed in accordance with usage frequencies of the applications.

(7) The information processing apparatus according to (5) above, wherein the priorities of the applications get higher when any one of other information processing apparatuses corresponding to any one of the applications is in use.

(8) The information processing apparatus according to any of (4) through (7) above, wherein the display control block displays the list of applications in a layered structure in accordance with the priorities of the applications.

(9) The information processing apparatus according to (8) above, wherein the display control block displays
the list of applications in a first layer in accordance with the priorities of the applications,
a list of the other information apparatuses in a second layer, and
the list of applications of each of the other information processing apparatuses in a third layer.

(10) The information processing apparatus according to (4) above, wherein the display control block adds, for each of the applications, information indicative of other information processing apparatuses corresponding to the applications, and displays the list of applications.

(11) The information processing apparatus according to (4) above, wherein, if an application to be executed is selected from the list of applications, the display control block displays a moving image that disappears from a screen as if the selected application moved to another information processing apparatus.

(12) The information processing apparatus according to (3) above, further including:
an own information capture section configured to capture information of an own coordinatable application in response to the user operation, wherein
on the basis of information about applications of other information processing apparatuses received by the application information reception and information about an own application captured by the own information capture block, the command transmission section transmits a command for executing a user-specified application among the coordinatable applications to one of any of the other information processing apparatuses corresponding to the applications and the information processing apparatus.

(13) An information processing method including:
causing an information processing apparatus to request another information processing apparatus for information about a coordinatable application in response to a user operation;
causing the information processing apparatus to receive the information about the application of the above-mentioned another information processing apparatus transmitted therefrom in response to the requesting; and
causing the information processing apparatus to transmit a command for executing a user-specified application among coordinatable applications to the above-mentioned another information processing apparatus corresponding to the user-specified application on the basis of the received information of the application of the above-mentioned another information processing apparatus.

(14) An information processing apparatus including:
an application information transmission block configured, in response to a request for information about a coordinatable application transmitted in response to a user operation to an authenticated information processing apparatus from another information processing apparatus, to transmit the application information to the above-mentioned another information processing apparatus; and a command execution block configured, if a command for executing a user-specified application among coordinatable applications comes on the basis of the application information transmitted from the application information transmission block, to execute the command.

(15) The information processing apparatus according to (14) above, further including:

a display control block configured to display a moving image appearing from outside a screen as if the application moved from the above-mentioned another information processing apparatus when the command for executing the application comes.

(16) An information processing method including:

causing an information processing apparatus to transmit, in response to a request for information about a coordinatable application transmitted in response to a user operation to an authenticated information processing apparatus from another information processing apparatus, the application information to the above-mentioned another information processing apparatus; and causing the information processing apparatus to execute a command for executing a user-specified application among coordinatable applications when the command comes on the basis of the application information.

What is claimed is:

1. An information processing system; comprising:
    a first information processing apparatus;
    a second information processing apparatus external to the first information processing apparatus; and
    a third information processing apparatus external to the first information processing apparatus and the second information processing apparatus,
    each of the second information processing apparatus and the third information processing apparatus being paired with the first information processing apparatus such that said second information processing apparatus is paired with the first information processing apparatus while said third information processing apparatus is paired with the first information processing apparatus and such that each of the second information processing apparatus and the third information processing apparatus is enabled for direct communication with the first information processing apparatus,
    said first information processing apparatus has
    an application information request block configured to request the second information processing apparatus for information about a coordinatable application, based on information acquired about devices paired with the first information processing apparatus and in response to a user operation at the third information processing apparatus in which the user operation at the third information processing apparatus is transmitted directly to the first information processing apparatus,
    an application information reception block configured to receive the information about the application of said second information processing apparatus transmitted from said second information processing apparatus in response to the request from said application information request block, and
    a command transmission section configured to transmit a command for executing a user-specified application among coordinatable applications to said second information processing apparatus corresponding to said user-specified application on the basis of the information of the application of said second information processing apparatus received by said application information reception block, and
    said second information processing apparatus has
    an application information transmission block configured to transmit the information about the application of said second information processing apparatus requested by said application information request block to said first information processing apparatus, and
    a command execution block configured to execute said command transmitted by said command transmission section.

2. The information processing apparatus of claim 1, wherein the user-specified application is installed on the information processing apparatus and the second information apparatus and not installed on the third information processing apparatus when the second information processing apparatus is requested for the information about the coordinatable application.

3. An information processing apparatus comprising:
    an application information request block configured to request other information processing apparatuses for information about a coordinatable application, based on information acquired about devices paired with the information processing apparatus and in response to a user operation at a third information processing apparatus external to the information processing apparatus and the other information processing apparatuses, in which each of the other information processing apparatuses and the third information processing apparatus is paired with the information processing apparatus such that each of the other information processing apparatuses is paired with the information processing apparatus while said third information processing apparatus is paired with the information processing apparatus and such that each of the other information processing apparatuses and the third information processing apparatus is enabled for direct communication with the information processing apparatus, and in which the user operation at the third information processing apparatus is transmitted directly to the information processing apparatus;
    an application information reception block configured to receive the information about the applications of said other information processing apparatuses transmitted from said other information processing apparatuses in response to the request by said application information request block; and
    a command transmission section configured to transmit a command for executing a user-specified application among coordinatable applications to said other information processing apparatuses corresponding to said user-specified application on the basis of the information of the application of said other information processing apparatuses received by said application information reception block.

4. The information processing apparatus according to claim 3, wherein said application information request block requests for information about an application that is coordinatable with a situation in said information processing apparatus, in which the situation is content being displayed or an active application in said information processing apparatus when the other information processing apparatuses is requested for the information about a coordinatable application.

5. The information processing apparatus according to claim 4, further comprising:
an own information capture section configured to capture information of an own coordinatable application in response to said user operation, wherein
on the basis of information about applications of other information processing apparatuses received by said application information reception and information about an own application captured by said own information capture block, said command transmission section transmits a command for executing a user-specified application among the coordinatable applications to one of any of said other information processing apparatuses corresponding to said applications and said information processing apparatus.

6. The information processing apparatus according to claim 4, further comprising:
a display control block configured to display a list of the coordinatable applications on the basis of the information about the applications of said other information processing apparatuses received by said application information reception block.

7. The information processing apparatus according to claim 6, wherein said display control block displays said list of applications in accordance with priorities of said applications.

8. The information processing apparatus according to claim 7, wherein said priorities of the applications are changed in accordance with usage frequencies of said applications.

9. The information processing apparatus according to claim 7, wherein said priorities of said applications get higher when any one of other information processing apparatuses corresponding to any one of said applications is in use.

10. The information processing apparatus according to claim 6, wherein said display control block displays said list of applications in a layered structure in accordance with the priorities of said applications.

11. The information processing apparatus according to claim 6, wherein said display control block adds, for each of said applications, information indicative of other information processing apparatuses corresponding to said applications, and displays said list of applications.

12. An information processing apparatus comprising:
an application information request block configured to request other information processing apparatuses for information about a coordinatable application in response to a user operation;
an application information reception block configured to receive the information about the applications of said other information processing apparatuses transmitted from said other information processing apparatuses in response to the request by said application information request block;
a command transmission section configured to transmit a command for executing a user-specified application among coordinatable applications to said other information processing apparatuses corresponding to said user-specified application on the basis of the information of the application of said other information processing apparatuses received by said application information reception block,
wherein said application information request block requests for information about an application that is coordinatable with a situation, in which the situation is content being displayed or an active application, in said information processing apparatus;
a display control block configured to display a list of the coordinatable applications on the basis of the information about the applications of said other information processing apparatuses received by said application information reception block,
wherein said display control block displays said list of applications in a layered structure in accordance with the priorities of said applications,
wherein said display control block displays
said list of applications in a first layer in accordance with the priorities of said applications,
a list of said other information apparatuses in a second layer, and
said list of applications of each of said other information processing apparatuses in a third layer.

13. An information processing apparatus comprising:
an application information request block configured to request other information processing apparatuses for information about a coordinatable application in response to a user operation
an application information reception block configured to receive the information about the applications of said other information processing apparatuses transmitted from said other information processing apparatuses in response to the request by said application information request block;
a command transmission section configured to transmit a command for executing a user-specified application among coordinatable applications to said other information processing apparatuses corresponding to said user-specified application on the basis of the information of the application of said other information processing apparatuses received by said application information reception block,
wherein said application information request block requests for information about an application that is coordinatable with a situation, in which the situation is content being displayed or an active application, in said information processing apparatus;
a display control block configured to display a list of the coordinatable applications on the basis of the information about the applications of said other information processing apparatuses received by said application information reception block,
wherein, if an application to be executed is selected from said list of applications, said display control block displays a moving image that disappears from a screen as if the selected application moved to another information processing apparatus.

14. An information processing method comprising:
causing an information processing apparatus to request another information processing apparatus for information about a coordinatable application, based on information acquired about devices paired with the information processing apparatus and in response to a user operation at a third information processing apparatus external to the information processing apparatus and the another information processing apparatus, in which each of the another information processing apparatus and the third information processing apparatus is paired with the information processing apparatus such that the another information processing apparatus is paired with the information processing apparatus while said third information processing apparatus is paired with the information processing apparatus and such that each of the another information processing apparatus and the third information processing apparatus is enabled for direct communication with the information processing apparatus, and in which the user operation at the third information processing apparatus is caused to be transmitted directly to the information processing apparatus;

causing said information processing apparatus to receive the information about the application of said another information processing apparatus transmitted from said another information processing apparatus in response to the requesting; and causing said information processing apparatus to transmit a command for executing a user-specified application among coordinatable applications to said another information processing apparatus corresponding to said user-specified application on the basis of the received information of the application of said another information processing apparatus.

15. An information processing apparatus comprising:

an application information transmission block configured, in response to a request for information about a coordinatable application transmitted from another information processing apparatus based on information acquired about devices paired with the another information processing apparatus and in response to a user operation to an authenticated information processing apparatus, to transmit the application information to said another information processing apparatus, in which the authenticated information processing apparatus is external to the information processing apparatus and the another information processing apparatus, in which each of the information processing apparatus and the authenticated information processing apparatus is paired with the another information processing apparatus such that the information processing apparatus is paired with the another information processing apparatus while said authenticated information processing apparatus is paired with the another information processing apparatus and such that each of the information processing apparatus and the authenticated information processing apparatus is enabled for direct communication with the another information processing apparatus, and in which the user operation at the authenticated information processing apparatus is transmitted directly to the another information processing apparatus; and a command execution block configured, if a command for executing a user-specified application among coordinatable applications comes on the basis of the application information transmitted from said application information transmission block, to execute said command.

16. The information processing apparatus according to claim 15, further comprising:

a display control block configured to display a moving image appearing from outside a screen as if said application moved from said another information processing apparatus when said command for executing said application comes.

17. An information processing method comprising:

causing an information processing apparatus to transmit, in response to a request for information about a coordinatable application transmitted from another information processing apparatus based on information acquired about devices paired with the another information processing apparatus and in response to a user operation to an authenticated information processing apparatus, the application information to said another information processing apparatus, in which the authenticated information processing apparatus is external to the information processing apparatus and the another information processing apparatus, in which each of the information processing apparatus and the authenticated information processing apparatus is paired with the another information processing apparatus such that the information processing apparatus is paired with the another information processing apparatus while said authenticated information processing apparatus is paired with the another information processing apparatus and such that each of the information processing apparatus and the authenticated information processing apparatus is enabled for direct communication with the another information processing apparatus, and in which the user operation at the authenticated information processing apparatus is transmitted directly to the another information processing apparatus; and causing said information processing apparatus to execute a command for executing a user-specified application among coordinatable applications when said command comes on the basis of the application information.

* * * * *